April 19, 1966    J. G. BRYAN ETAL    3,246,761
LIQUID TREATING APPARATUS
Filed Oct. 30, 1962    2 Sheets-Sheet 1

INVENTOR.
BY William R. Lieberman
ATTORNEY

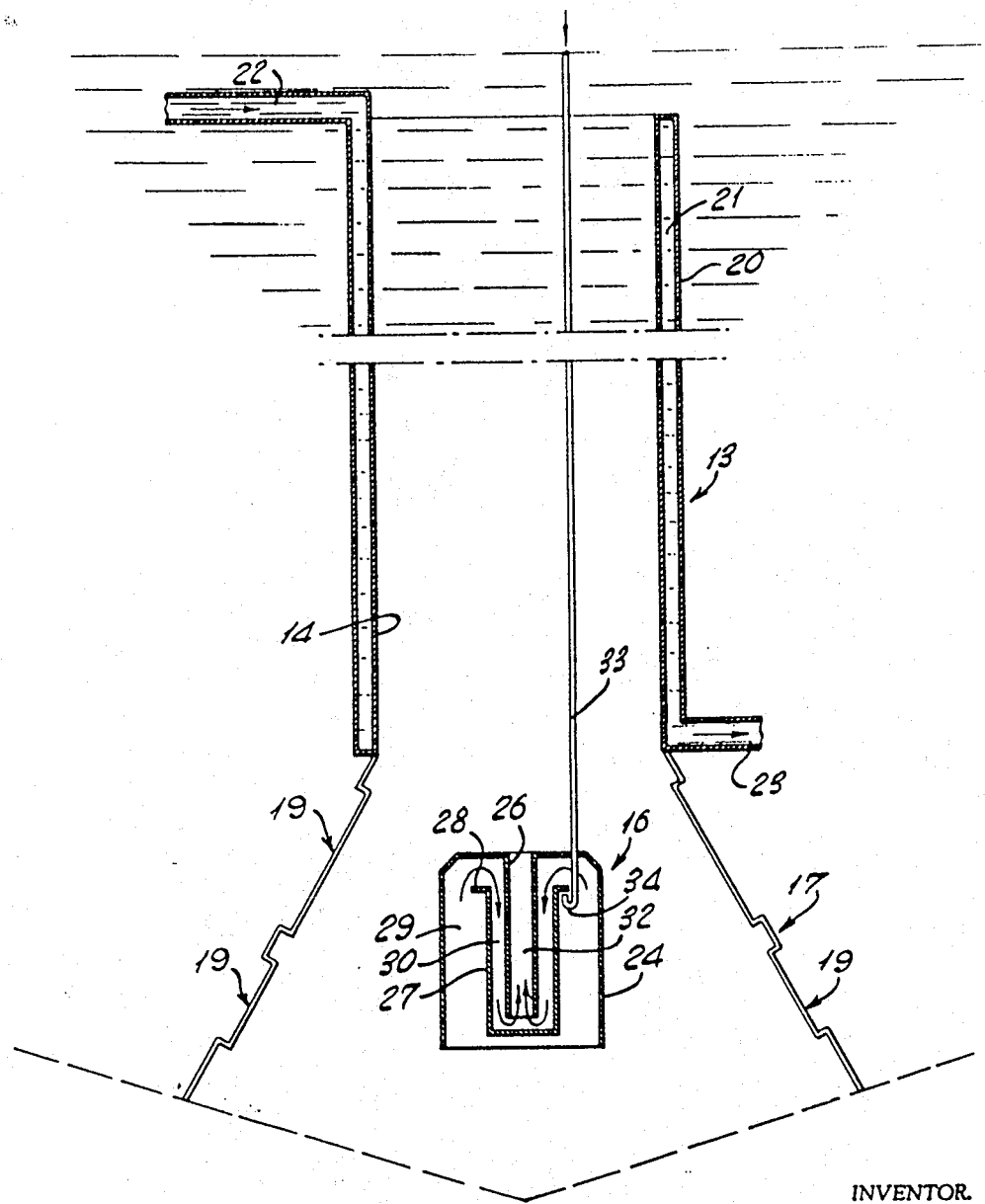

United States Patent Office 3,246,761
Patented Apr. 19, 1966

3,246,761
LIQUID TREATING APPARATUS
John Gordon Bryan, White Sheiling, Dry Hill Lane, Sandridge, Kent, England, and Ludwik Smolski and Anthony A. Kippen, both of Suite 2900, 1155 Dorchester Blvd. W., Montreal, Quebec, Canada
Filed Oct. 30, 1962, Ser. No. 234,146
7 Claims. (Cl. 210—180)

The present invention relates generally to improvements in methods of treating liquids and apparatus therefor, and in particular it relates to an improved method and apparatus for circulating large volumes of liquid in a chamber and for controlling the temperature thereof.

Many reaction processes require the storage and agitation of large volumes of liquid and the concurrent heating or cooling to control the temperature thereof. The agitation of the liquid is usually necessitated by the presence of a solid phase which should be uniformly suspended in the liquid and the need for maintaining the liquid at a uniform predetermined optimum temperature. These conditions are encountered in sewage digestion systems and the apparatus of the present invention is employed to great advantage in such systems.

The primary function of a sewage digestion system is to reduce, biochemically, the volume of sludge for ultimate disposal. In anaerobic digestion, organic matter is degenerated or destroyed and methane gas is produced. The process is delicately balanced, being sensitive not only to temperature but also to local concentrations of the various constituents. Thus, in order to achieve a high rate of digestion, that is, a high solids loading per unit volume and a short detention period, it is essential to maintain uniform sludge distribution and a thermal homogeneity of the tank content at a predetermined temperature in the biological phase of the digestion process.

Moreover, in effecting the temperature control and homogenization of the digestion tank contents of sludge, it is desirable that moving mechanical parts in contact with the sludge be eliminated to prevent interference with the biological digestion processes and that conduits through which the sludge flows be sufficiently large to prevent the blocking thereof and interference with the desired circulation and agitation.

It is, therefore, a principal object of the present invention to provide an improved method and apparatus for the treatment of liquid materials.

Another object of the present invention is to provide an improved method and apparatus for circulating and agitating large volumes of liquid materials while controlling, concurrently therewith, the temperature thereof by the cooling or heating of the liquid.

Still another object of the present invention is to provide an improved apparatus for agitating and temperature-controlling large volumes of liquid material without exposing the liquid material to small passageways or moving parts.

A further object of the present invention is to provide an improved sewage digestion apparatus.

Still a further object of the present invention is to provide an apparatus of the above nature characterized by its simplicity, ruggedness, reliability, versatility, efficiency and low cost.

The above and other objects of the present invention will become apparent from a reading of the following description taken in conjunction with the accompanying drawing, wherein:

FIGURE 3 is an enlarged detailed vertical sectional view of the pumping and heat exchange system of the apparatus of FIGURE 2.

In the co-pending application of Alec Hibburd Laurie, Serial No. 64,582, filed October 24, 1960, now U.S. Patent No. 3,148,509, there is described an apparatus for reducing sea waves, destratifying reservoirs and inhibiting the formation of ice in large bodies of water. This apparatus basically comprises a large diameter vertical conduit or tube which has top and bottom openings and is submerged in a body of liquid. An inverted siphon is disposed in the lower part of the conduit and is connected to a source of compressed air and is so dimensioned as to generate intermittently successive bubbles of a diameter of the order of the diameter of the conduit whereby the bubbles function as expanding pistons to convey the liquid upwardly through the conduit and hence effect the circulation thereof. It has been discovered that there is an excellent heat transfer relationship between the wall of the conduit and the ascending liquid. Although a highly efficient pumping action is effected by the rising bubbles, the velocity normally attained by the conveyed liquid in the conduit along the conduit wall is of an order where turbulence is produced and the heat transfer conditions between the conduit wall and the rising liquid is thus of a high order. Furthermore, it has also been found that the liquid velocity along the interface of the conduit wall is such as to effect continuous cleansing of the conduit face.

The present invention thus, in a sense, contemplates the provision of a liquid treating apparatus including a substantially vertically extending conduit or tube provided with an upper outlet opening and a lower inlet opening adapted to be submerged in the liquid and large bubble generating means adapted to deliver sequential bubbles to the said conduit. While the conduit temperature control means is advantageously defined by a compartment disposed on the conduit and through which a heat exchange medium is circulated, other temperature control means may be associated with the conduit, for example, electrical resistance heaters and the like. Furthermore, although the conduit outlet opening is preferably submerged, in many applications it may be desirable that it project above the level of the liquid, for example for aeration purposes, in which case, nozzles designed in the well known manner may be provided for deflecting the conduit liquid discharge along the desired effluent path.

As applied to the digestion of sewage, one or more of the aforesaid heat exchange pumping devices is submerged in the liquid sludge which is contained in the conventional closed digestion tank. Methane produced by the digestion process is withdrawn from the top of the tank and pumped by way of a compressor to the bubble generator. A part of the methane is bled off and burned in a boiler which in turn heats a heat exchange medium, for example water, which is circulated through the conduit jacket.

Figure 1:
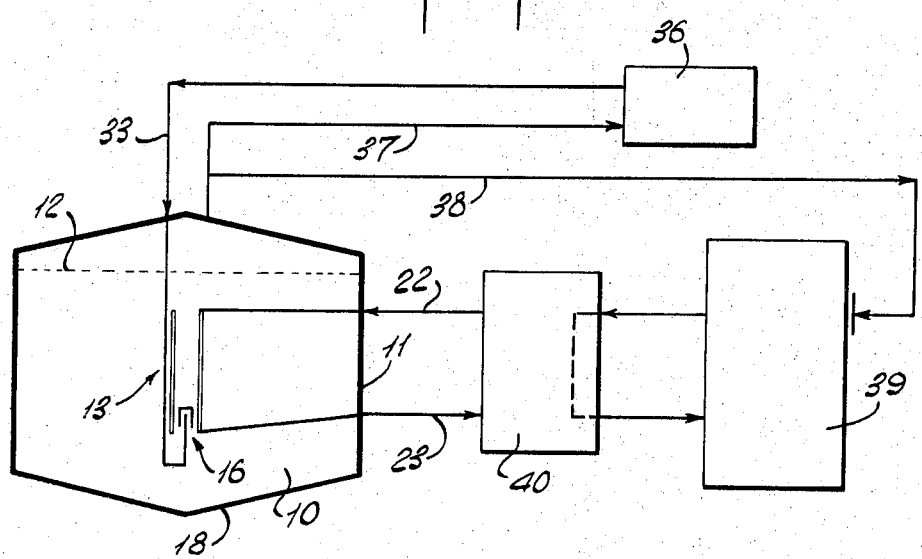
FIGURE 1 is a schematic flow diagram of a sewage disposal system embodying the present invention.
Figure 2:
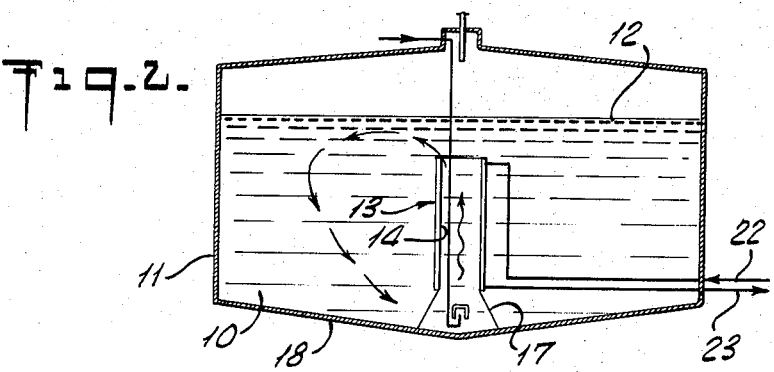
FIGURE 2 is a vertical sectional view, partially schematic, of a digestion tank embodying the present invention and which may be employed in the system of FIGURE 1.

Referring now to the drawings and more particularly to FIGURES 1 through 3 thereof, which illustrate a preferred embodiment of the present invention, specifically a sewage digestion system, reference numeral 10 generally designates a digestion chamber of the dimensions normally employed in sewage digestion systems and delineated by a tank 11. Tank 11 may be formed of conventional material such as soft steel, or otherwise. Chamber 10 contains the sludge liquid which reaches a level 12 below the top of the tank to form a gas space above liquid level 12. Feed and discharge pipes communicate with chamber 10 to effect the introduction of liquid-carried sewage and the removal of the effluent, in the usual manner. Located in chamber 10, below the liquid level 12, is a liquid circulating device 13 constructed in accordance with the present invention, the liquid circulating device 13 including a vertical conduit or tube 14 of relatively large diameter and an inverted siphon type bubble generator 16 coaxially registering with the lower part of conduit 14.

As best seen in FIGURE 3 of the drawing, tube 14 is mounted atop a frusto-conical support 17 coaxially mounted on the base 18 of tank 11, support 17 being provided with a plurality of axially and circumferentially spaced liquid inlet openings 19. Surrounding tube 14 is a radially spaced coaxial cylindrical wall 20 which delineates, with tube 14, a heat exchange medium jacket 21, provided at its top and bottom with inlet and outlet pipes 22 and 23 respectively.

Bubble generator 16 is, as noted above, of siphon type including an outer open bottom inverted cup shaped member 24 provided with an opening in the top of the cup and extending downwardly to a point slightly above the bottom thereof. A second upright cup shaped member 27 is mounted in coaxial registration with tube 26 and is provided with an outwardly directed upper peripheral flange 28. Cup shaped members 24 and 27 and tube 26 delineate outer, intermediate and inner coaxial chambers 29, 30 and 32 respectively, the outer and intermediate chambers communicating along their tops and the inner and intermediate chambers communicating along their respective bottoms. A gas feed pipe 33 extends downwardly through the top of tank 10 and into chamber 29, terminating in an upwardly directed nozzle 34 directed toward the underface of flange 28.

A more detailed description of the bubble generator is given in the above-identified Laurie patent application. The dimensions of the chambers of bubble generator 16 are such that intermittent bubbles are formed by generator 16 with the continuous feed of gas through pipe 33, and the bubbles as they emerge from the generator 16 and enter the conduit 13 have an area of transverse cross-section occupying a major part of the area of the transverse cross-section of tube 14 and preferably occupy substantially the full cross-sectional area of said tube 14. As described in the above-identified Laurie patent application, as gas flows from pipe 33 into the outer chamber 32 and intermediate chamber 30 of generator 16, the level of gas in chambers 29 and 30 drops until it reaches the lower opening in tube 26 whereupon the gas content of generator 16 is siphoned upwardly through tube 32 and forms a single bubble, the lower gas level in generator 16 thereby rising to break the siphon upon the emergence of the bubble.

The bubbles are intermittently formed at a rate which is a function of gas feed through pipe 33. As the bubble rises it functions as an expandable piston and transports the liquid ahead of it up through conduit 14 and out of the tube or discharge opening thereof and draws liquid through openings 19 and upwardly through the lower or feed opening of tube 14.

Pipe 33 is connected to the outlet of a compressor 36, the inlet 37 of which is connected to the gas space in the upper part of tank 11 so that the bubble generating gas is a methane gas which is produced as a result of the sewage digestion process. A suitably valved pipe 38 also communicates with the upper methane zone of tank 11 and is connected to a conventional methane burner 39. Burner 39 in turn is associated in the usual manner with a calorifier 40 to effect a heat transfer from the methane burner 39 to a heat exchange medium which is circulated through the calorifier 40 by a suitable pump. The heat exchange medium, which may be water, steam or other suitable material, flows at an elevated temperature from the calorifier 40 by way of pipe 22 through jacket 25 and back to the calorifier through return pipe 23.

In operation, digestion chamber 10 contains the liquid sludge which is maintained in a substantially homogeneous condition by reason of the agitation imparted thereto by the pumping device 13. The temperature of the sludge is maintained uniformly throughout by reason of the agitation thereof and is controlled to an optimum level by adjustment of burner 39. In the event that the ambient weather conditions are such that the liquid contents of the chamber 10 are above the optimum temperature, the heat exchange medium may be cooled so as to lower the sludge temperature in any well known manner. The use of pump 13 results in a continuous steady flow of sludge when the gas feed to generator 16 is at such a rate that a bubble is emitted into tube 14 before the next preceding bubble is discharged from the upper end of tube 14.

The average viscosity of digester sludge at 95° F. is approximately $6 \times 10^{-5}$ slug ft.$^{-1}$ sec.$^{-1}$, and the mean rate of flow of such sludge through a tube as 14, having a diameter of 1 foot, would vary from about 1 cubic foot per second to over 5 cubic feet per second depending directly upon the length of the tube which is between 10 and 50 feet long and upon the rate of feed of gas to the bubble generator which is from .02 cubic foot per second to .20 cubic foot per second. Upon increasing the diameter of the tube 14 to 1½ feet, the rate of sludge flow under the above conditions varies between 0.4 to over 7 cubic feet per second. In the normal operation of a closed digester, the flow should not be allowed to fall below 2 million gallons per day. Thus in a 12-inch diameter unit, the linear velocity is approximately 5 feet per second which leads to a self-cleansing effect thereby preventing the formation of a scum layer on the tube wall. Furthermore, the sludge flow in the tube is quite turbulent so that a good heat transfer is achieved between the tube 14 and the ascending sludge. While some heat transfer is effected between the sludge and the outer wall of the tube, this is relatively small. It has been found that the heat transfer coefficient obtainable under the above conditions is in the range of 150 to 200 B.t.u. ft.$^{-2}$ hr.$^{-1}$ ° F.$^{-1}$.

Typically, a sludge flow of about 6.5 ft.$^{-3}$ sec.$^{-1}$, that is 3.5 million gallons per day, is achieved for a recirculation of approximately 15 ft.$^{-3}$ min.$^{-1}$ of free methane (60° F. and 14.7 p.s.i.a.) with a power consumption of less than 2 HP. Such an installation would "turn over" the entire contents of a million gallon digester every 6.5 hours. The heat input would be of the order of 1.5 million B.t.u. per hour, and the circulating water requirement 40 gallons per minute at a mean temperature of approximately 40° F. above that in the digester.

It should be noted that more than one pumping device may be located in the digestion tank and suitably distributed throughout the volume therein and that the diameter as not to interfere with substantially unrestricted flow of sludge or other liquid material, as the case may be.

As a specific example of the present apparatus for use in a closed digestion tank for the anaerobic digestion of a sewage, a mild steel jacketed pipe 14 which is 20 feet long and 18 inches in diameter is mounted vertically in a tank 60 feet in diameter and 30 feet deep, the top of the tube being located several feet below the surface of the liquid which prevents an accumulation of a scum layer. In practice it has been observed that this action has actually broken up and removed a scum layer several feet thick which had been allowed to accumulate prior to the operation of the pumping device 13.

Figure 4:
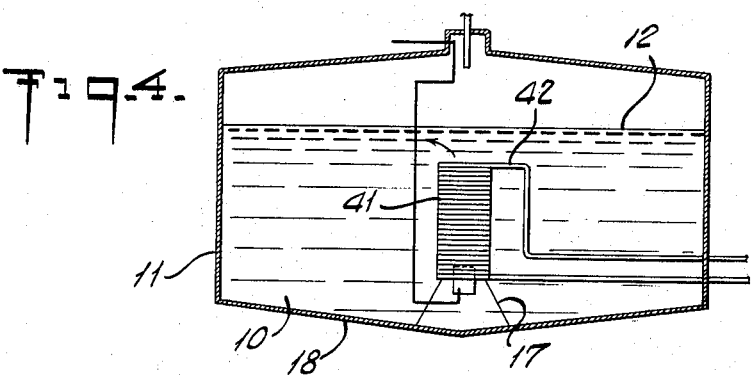
FIGURE 4 is a view similar to FIGURE 2 of another embodiment of the present invention.

In FIGURE 4 of the drawing there is illustrated another embodiment of the present invention which differs from that first described only in that the jacketed tube 14 of the first embodiment is replaced by a substantially similarly dimensioned tube 41 formed of a helically wound pipe 42, successive convolutions of pipe 42 need not be in substantial abutment. The operation of the apparatus last described is similar to that first described and requires no further explanation.

While there have been described and illustrated preferred embodiments of the present invention, it is apparent that numerous alterations, omissions and additions may be made without departing from the spirit thereof.

What is claimed and desired to be secured by Letters Patent is:

1. A liquid-treating apparatus comprising a liquid-holding vessel, a vertically extending tube located in said vessel and having an upper discharge opening and a lower inlet opneing submerged in said liquid, means submerged in said liquid for delivering to said tube sequential bubbles each having a transverse cross-section occupying at least a major portion of the transverse cross-section of said tube, and means including a heating member in heat transfer relationship with said tube for varying the temperature of said tube, said bubbles functioning as pistons to raise said liquid in said tube and impart turbulence thereto whereby to effect a good heat transfer between said tube and said rising liquid and effect a cleansing action of the inside face of said tube.

2. A liquid-treating apparatus comprising a liquid-holding vessel, a vertically extending tube located in said vessel and having an upper discharge opening and a lower inlet opening submerged in said liquid, means for delivering to said tube sequential bubbles, each having a transverse cross-section occupying at least a major portion of the transverse cross-section of said tube and means including a heating member in heat transfer relationship with said tube for heating said tube, said bubbles functioning as pistons to raise said liquid in said tube and impart turbulence thereto whereby to effect a good heat transfer between said tube and said rising liquid and effect a cleansing action of the inside face of said tube.

3. A liquid-treating apparatus comprising a liquid-holding vessel, a vertically extending jacketed tube located in said vessel and having an upper discharge opening and a lower inlet opening submerged in said liquid, means for delivering to said tube sequential bubbles, each having a transverse cross-section occupying at least a major portion of the transverse cross-section of said tube, and means for circulating a heat exchange medium through said tube jacket, said bubbles functioning as pistons to raise said liquid in said tube and impart turbulence thereto whereby to effect a good heat transfer between said tube and said rising liquid and effect a cleansing action of the inside face of said tube.

4. A liquid-treating apparatus comprising a liquid-holding vessel, a vertically extending tube located in said vessel and having an upper discharge opening and a lower inlet opening submerged in said liquid and defined by a helically wound pipe, successive convolutions of which are in substantial abutment, means for delivering to said tube sequential bubbles, each having a transverse cross-section occupying at least a major portion of the transverse cross-section of said tube, and means for circulating a heat exchange medium through said helically wound pipe, said bubbles functioning as pistons to raise said liquid in said tube and impart turbulence thereto whereby to effect a good heat transfer between said tube and said rising liquid and effect a cleansing action of the inside face of said tube.

5. A sewage digestion system comprising a sewage digestion tank in which a sludge is subjected to anaerobic digestion with the evolution of a methane gas, a substantially vertically extending tube located in said tank and having an upper discharge opening and a lower inlet opening submerged in said sludge, means for delivering to said tube bubbles each having a transverse cross-section occupying a major portion of the transverse cross-section of said tube, means for varying the temperature of said tube, and a gas compressor having an inlet connected to said tank above the level of said sludge and an outlet connected to said bubble delivering means, said bubbles functioning as pistons to raise said sludge in said tube and impart turbulence thereto whereby to effect a good heat transfer between said tube and said rising sludge and effect a cleansing action of the inside face of said tube.

6. The sewage digestion system of claim 5, wherein said means for varying said tube temperature includes means for circulating a heat transfer medium in heat transfer relationship with said tube.

7. The sewage digestion system of claim 6, including a burner having a gas fuel inlet connected to said tank above the level of said sludge and means energized by said burner to heat said heat transfer medium.

References Cited by the Examiner

UNITED STATES PATENTS

| | | | |
|---|---|---|---|
| 894,056 | 7/1908 | Rogers | 210—169 X |
| 2,188,847 | 1/1940 | Streander | 210—14 X |
| 2,720,489 | 10/1955 | Walker | 210—14 X |
| 3,055,502 | 9/1962 | Cunetta | 210—14 X |

FOREIGN PATENTS 460,612   6/1928   Germany.

OTHER REFERENCES

Walker: "Gaslifter," Water Pollution Control Federation Journal, January 1961, vol. 33, page 50a.

MORRIS O. WOLK, *Primary Examiner.*